United States Patent

Nötzel

[11] Patent Number: 6,029,533
[45] Date of Patent: Feb. 29, 2000

[54] CONTROL SYSTEMS FOR HANDLING MACHINES

[75] Inventor: Ralf Frank Nötzel, Netphen-Eschenbach, Germany

[73] Assignee: Dango & Dienenthal Maschinenbau GmbH, Siegen, Germany

[21] Appl. No.: 09/042,443

[22] Filed: Mar. 13, 1998

[30] Foreign Application Priority Data

Mar. 14, 1997 [DE] Germany .......................... 197 10 627

[51] Int. Cl.$^7$ ............................. G05G 9/047; G05G 1/04
[52] U.S. Cl. ......................................... 74/471 XY; 74/491
[58] Field of Search ............................. 74/471 XY, 491, 74/523

[56] References Cited

U.S. PATENT DOCUMENTS 4,624,537 11/1986 Hanssen et al. ........................ 350/531
5,312,217 5/1994 Lawrence et al. ..................... 74/471 X
5,450,054 9/1995 Schmersal .............................. 74/471 X

FOREIGN PATENT DOCUMENTS 4136441 10/1996 Germany .

Primary Examiner—Allan D. Herrmann
Attorney, Agent, or Firm—Friedrich Kueffner

[57] ABSTRACT

A control system for the axes of movement of handling machines with linear drives and/or pivoting drives for transporting and for positioning workpieces relative to and in a target point, particularly relative to and on processing machines. The control system combines a speed adjustment or speed control of the axes of movement of the handling machine for moving a workpiece into the area of a target point, on the one hand, and a position control of the axes of movement for the precise positioning of the workpiece in the target point, on the other hand.

3 Claims, 3 Drawing Sheets

CONTROL SYSTEMS FOR HANDLING MACHINES

BACKGROUND OF THE INVENTION

1. Field of the Invention

The present invention relates to a control system for the axes of movement of handling machines with linear drives and/or pivoting drives for transporting and for positioning workpieces relative to and in a target point, particularly relative to and on processing machines.

2. Description of the Related Art

Handling machines of the known type as disclosed, e.g., in DE 41 36 441 C2, are used, for example, for transporting and positioning heavy forged pieces having a weight of above 100 kilograms relative to and on processing machines. Depending on the size and configuration, handling machines make it possible to position with the accuracy of a millimeter workpieces having a weight of many tons. The handling machines are equipped with a chucking device, for example, tongs, and a lever system for moving the tongs in several directions or degrees of freedom, wherein for each movement of the tongs in a certain direction a separate drive of the lever system is used. In handling machines intended for higher loads, hydraulic drives are used. Most handling machines are equipped with distance measuring systems which make it possible to determine by measuring the positions of the axes of movement.

As far as the control of the axes of movement of the handling machines is concerned, there are basically two different types of machines, namely, automatically operating machines which in accordance with a predetermined program always repeat a precisely defined sequence of movements, and manually operated machines. The first type of machines are robots if the machines have more than three degrees of freedom, wherein such robots are manufactured in various embodiments for different fields of technical applications.

The present invention is directed to handling machines which are controlled by an operator. Used as drives for the individual axes of movement of manually controlled handling machines are hydraulic drives, such as hydraulic cylinders and hydraulic motors with a decentralized hydraulic oil supply, or also electric drives.

The operator usually controls the handling machines by means of control levers which are also called joysticks. The operator requires a joystick for each available direction of movement of the machine. The directions of movement are sometimes integrated in a joystick offset by 90 degrees. For each direction of movement, the joysticks can be pivoted from the center position toward the left and right by a certain angle. Depending on the type of joystick, the joystick is returned automatically into the zero position by means of mechanical springs when the joystick is released. The joystick is coupled through a mechanical gear unit to an adjustable electric resistor whose value changes in dependence on the deflection of the joystick. By connecting a direct voltage to the resistor, the deflection of the joystick can be transformed into a voltage which is proportional to this deflection. This variable electric voltage can be utilized for two different types of control of the axes of movement of a handling machine.

In the first type of control, the variable voltage is utilized as a desired value for a speed adjustment or control. The speed adjustment or control directly influences the speed of the drive.

The operator visually controls the process, i.e., the speed and, thus, the position of the axes of movement, and is capable of controlling the speed and the position of the axes of movement in order to achieve a desired point of the displacement path of the axes of movement.

This control concept fails in the case of dynamic, quickly moveable axes of movement. When approaching a desired target position, the operator is not capable of precisely assessing the remaining distance. The axis of movement either stops in front of the desired position or it is moved past this position. It is then necessary to attempt another approach in order to achieve the desired target position. The operator has to have a certain level of experience and skill in order to be able to influence the pattern of the speed adjustment or speed control in such a way that the drive of the axes of movement comes to rest at the desired position of the axes. As a result, the operator requires a lot more time in order to accurately approach a desired target than would be necessary by the drive if based on pure computation. An advantage when using an operator as the "controller" is the high flexibility in the selection and possibilities of changing the target of an axis of movement. The above-described type of control of the axis of movement of a handling machine constitutes the classic speed adjustment. The embodiment with a speed control leads to the same result.

The second known control concept for the axes of movement of handling machines is based on a position control which can be carried out by an operator by means of a joystick.

As a rule, the joystick can be deflected from a middle zero position toward both sides by a certain angle. The extent of the maximum deflection depends on the type of construction.

The axis of movement to be controlled usually has a limited displacement distance whose magnitude depends on the type of construction of the respective handling machine. An exception are axes of movement constructed as axes of rotation or round axes which are freely rotatable in both directions of rotation.

When using a joystick for the position control of an axis of movement, the entire angle of movement of the joystick should correspond to the possible displacement distance of the driven axis of movement. Under this assumption, it is possible to assign to each position of the joystick a precisely determined position of the axis of movement on its possible displacement path. The "zero point" of the joystick is in the middle of the displacement distance of the axis of movement. For determining the relative position of an axis of movement, the axis must be equipped with a distance measuring system. This distance measuring system produces an electric signal whose magnitude is proportional to the position of the axis of movement. An adjusting signal is produced by a comparison of the position signals of the axis of movement and of the joystick. Magnitude and direction of this signal are dependent on the position of the axis of movement and the deflection of the joystick from its zero position by the operator. This position of the axis of movement constitutes the actual position and the position of the joystick results in the desired position. By carrying out a continuous comparison of the actual position and the desired position, the axis of movement is moved until the position of the axis of movement corresponds to the desired position predetermined by the joystick. This comparison is usually carried out several hundred times per second by means of an electronic system called a regulator. The speed of the regulator is far superior to the human capability to react. The axis of movement with its possible dynamics follows each new adjustment of the target position by means of the joystick by an operator.

This control principle is based on a position control. The positioning of the axis of movement to the desired target takes place more quickly and more accurately than would be the case in a speed adjustment by an operator because the positioning is exclusively determined by dynamic parameters of the axis of movement and is independent of the skill and experience of the operator. A disadvantage of this control principle is the low resolution of the position of the joystick in relation to the actual displacement distance of the axis of movement. This control principle fails especially in the case of long displacement distances of the axes of movement because, in that case, the ratio of the mechanical distances of the joystick and the axis of movement becomes too large and the desired positioning accuracy can no longer be achieved because the operator is no longer capable of positioning the joystick with sufficient precision.

The two control concepts described above have the aforementioned advantages and disadvantages and have long been used in various fields of technology.

SUMMARY OF THE INVENTION

Therefore, it is the object of the present invention to develop a control system for the axes of movement of handling machines which facilitates transporting and positioning of workpieces relative to and in a target point, particularly relative to and on processing machines, with greatest speed and with greatest accuracy. Another object is to provide a joystick for an operator for controlling the axes of movement of the handling machines in accordance with the novel control system.

In accordance with the present invention, a control system is provided which combines a speed adjustment or speed control of the axes of movement of the handling machine for moving a workpiece into the area of a target point, on the one hand, and a position control of the axes of movement for the precise positioning of the workpiece in the target point, on the other hand.

A joystick for hand ling machines with several axes of movement for workpieces equipped with the control system according to the present invention has a middle adjustment range located on both sides of the zero point for a position control of an axis of movement when precisely positioning a workpiece in a target point, as well as two outer adjustment ranges extending from the two end points of the middle adjustment range to the two end stops of the joystick for a speed adjustment or speed control of the axis of movement when moving the workpiece into the range of the target point.

The control system according to the present invention, which combines a speed adjustment or control with a position control, facilitates the rapid transport of the workpieces over large distances to processing machines and the precise positioning of the workpieces at the processing machines by means of the handling machines with several axes of movements equipped with the control system.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1B:
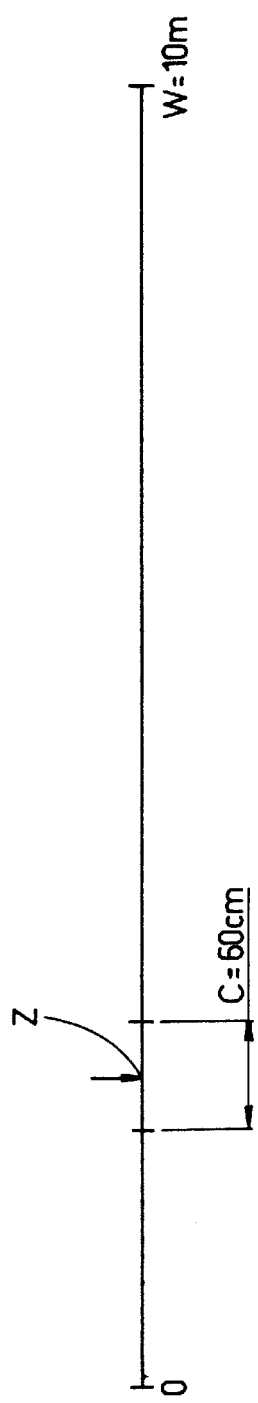
FIG. 1b is a schematic illustration of a displacement distance of an axis of movement controlled by the joystick.
Figure 1A:
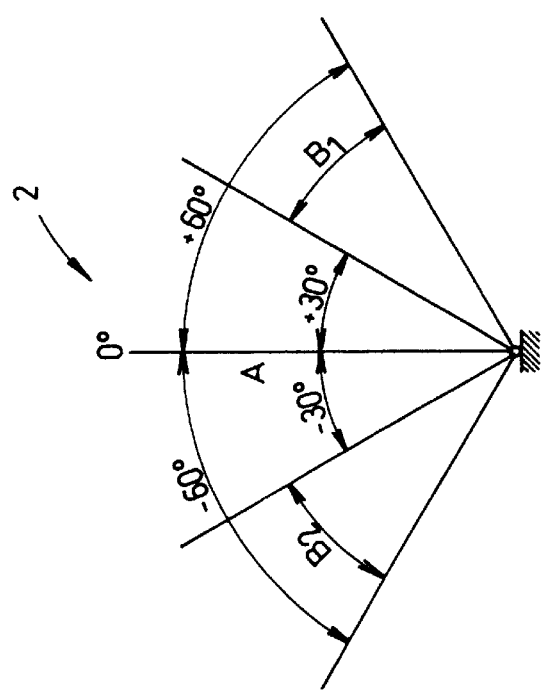
FIG. 1a is a schematic illustration of a joystick.

As illustrated in FIG. 1a, the total adjustment range of the joystick 2 to be actuated by an operator extends, for example, over an adjusting angle of 120°. The total adjustment range is divided into three adjustment ranges, namely a middle adjustment range A of ±30°, which is located on both sides of the zero degree position of the joystick 2, for the position control of the axis of movement when precisely positioning a workpiece in a target point Z, and two outer adjustment ranges $B_1$, $B_2$ which extend from the two end points of the middle adjustment range A over an adjustment angle of +30° to +60° and an adjustment angle of −30° to −60° to the two end stops of the joystick for carrying out the speed adjustment or speed control of the axis of movement when displacing the workpiece into the range of the target point Z. In the middle adjustment range A, the drive of the axis of movement follows the position of the joystick.

The total displacement distance W of the axis of movement illustrated in FIG. 1b is, for example, ten meters. The displacement distance Z of the axis of movement in the middle adjustment range A of the joystick is, for example, 60 cm and, thus, only a fraction of the total displacement distance W of the axis of movement. The percentage of the coverage of the total displacement distance of an axis of movement by the middle adjustment range A of the joystick is adjustable and may differ depending on the type of application. This makes it possible to increase the accuracy of the positioning of the axis of movement, and since the joystick is simple to operate, the joystick can also be operated by unskilled personnel. The limitation of the accuracy of positioning takes place practically only by the dynamic characteristics of the axis of movement and the measuring system used. Because of the "magnifier" function, the resolution is significantly increased in the middle adjustment range A of the joystick, and the manual positioning becomes simpler for the operator. In practice, the operator uses a large range of movement of the joystick for a relatively small displacement range of the axis of movement which is easily manageable.

Starting with the speed zero at the beginning of the adjusting ranges $B_1$, $B_2$ at an adjustment angle of +30° or −30°, by adjusting the joystick by 1 degree each, the operator is able to increase the speed of the axis of movement by, for example, a centimeter per second each to the positive or negative maximum speed of 30 cm per second at the maximum adjustment angle of the joystick of +60° or −60°. In the two outer adjustment ranges $B_1$, $B_2$, the speed of the axis of movement is proportional to the deflection of the joystick. When the joystick is returned from the outer adjusting ranges $B_1$ or $B_2$ into the middle adjustment range A, the axis of movement stops at the transition from the adjustment range $B_1$ or $B_2$ to the adjustment range A at an adjustment angle of +30° or −30° and the position control has then once again been reached, however, in this case possibly at a completely different point of the displacement distance W of the axis of movement. In the middle adjustment range A, which includes the adjustment angle range of +30° to −30°, the joystick represents a position in a range of 60 cm on the displacement distance of the axis of movement, wherein the adjustment of the joystick by one degree results in a movement of the axis of movement by one centimeter. Depending on the resolution of the middle adjustment range A of the joystick, it is possible to position the axis of movement very precisely within this "magnifier" or precision range.

Switching from the speed adjustment to the position control and conversely from the position control to the speed adjustment may be different depending on the task to be performed and the type of application. Basically, switching is possible either automatically by the deflection angle of the joystick or manually by means of keys which are integrated in the joystick or the control panel. It is also possible to have both controls continuously active and to carry out the transition between the control principles by using a fuzzy logic system. Within the switching possibilities mentioned above, additional variations of the transition between the position control and the speed adjustment or the speed control are possible. This must be determined depending on the requirements of each application.

The practical realization of the above-described control principle is possible, for example, by means of fast digital computers.

The control system will now be explained in more detail in connection with the block diagrams of FIGS. 2 and 3.

Figure 2:
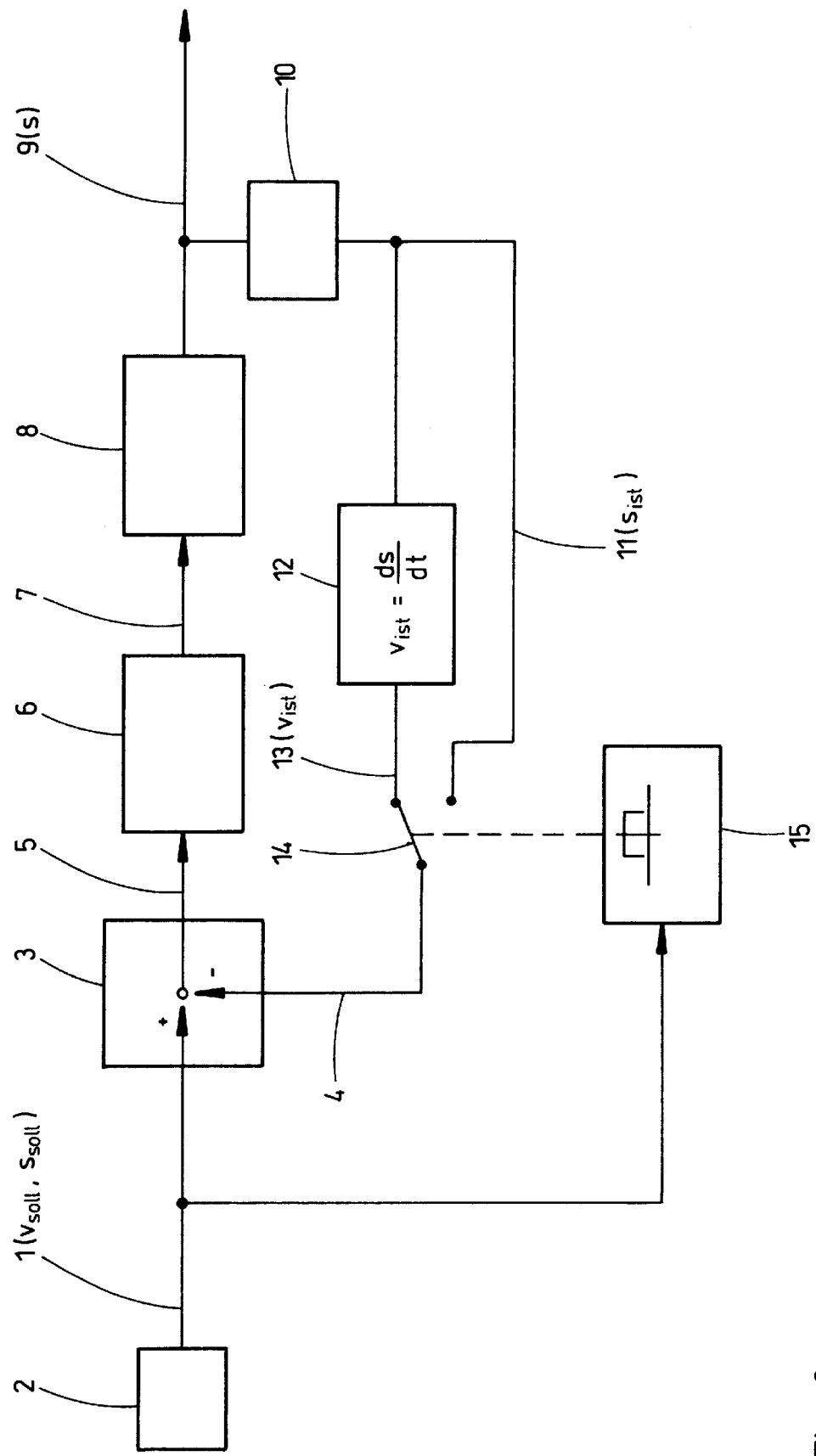
FIG. 2 is a block diagram of the control system according to the present invention.

The block diagram of FIG. 2 illustrates the operation of the system according to a first embodiment of the invention. The desired value 1, from which the joystick 2 starts, acts on the comparator 3. The actual value 4 is compared with the desired value 1 and results in a control deviation 5. The control unit 6 converts the control deviation 5 into an appropriate adjustment signal 7. This adjustment signal 7 acts on the drive and its mechanical unit 8 and produces the position 9 in this manner. The measuring system 10 determines the position 9 and produces the actual position value 11. The actual position value 11 is differentiated in the differentiator 12 and the speed value 13 is obtained. In accordance with a variation of the invention, the speed value 13 could also be measured directly. The switching unit 14 determines whether the position value 11 or the actual speed value 13 is used as the actual value 4 for the comparator 3. The position of the switching unit 14 is determined by a discriminator 15. The input value for the discriminator 15 is the desired value 1 of the joystick 2. In the case of small desired values, the switching unit 14 is adjusted such that the actual position value 11 reaches the comparator 3. In the case of large desired values 1, the switching unit 14 is adjusted in such a way that the actual speed value 13 reaches the comparator 3. Depending on the type of handling device, the adjustment of the control unit 6 can also be changed in dependence on the switching unit 14.

Figure 3:
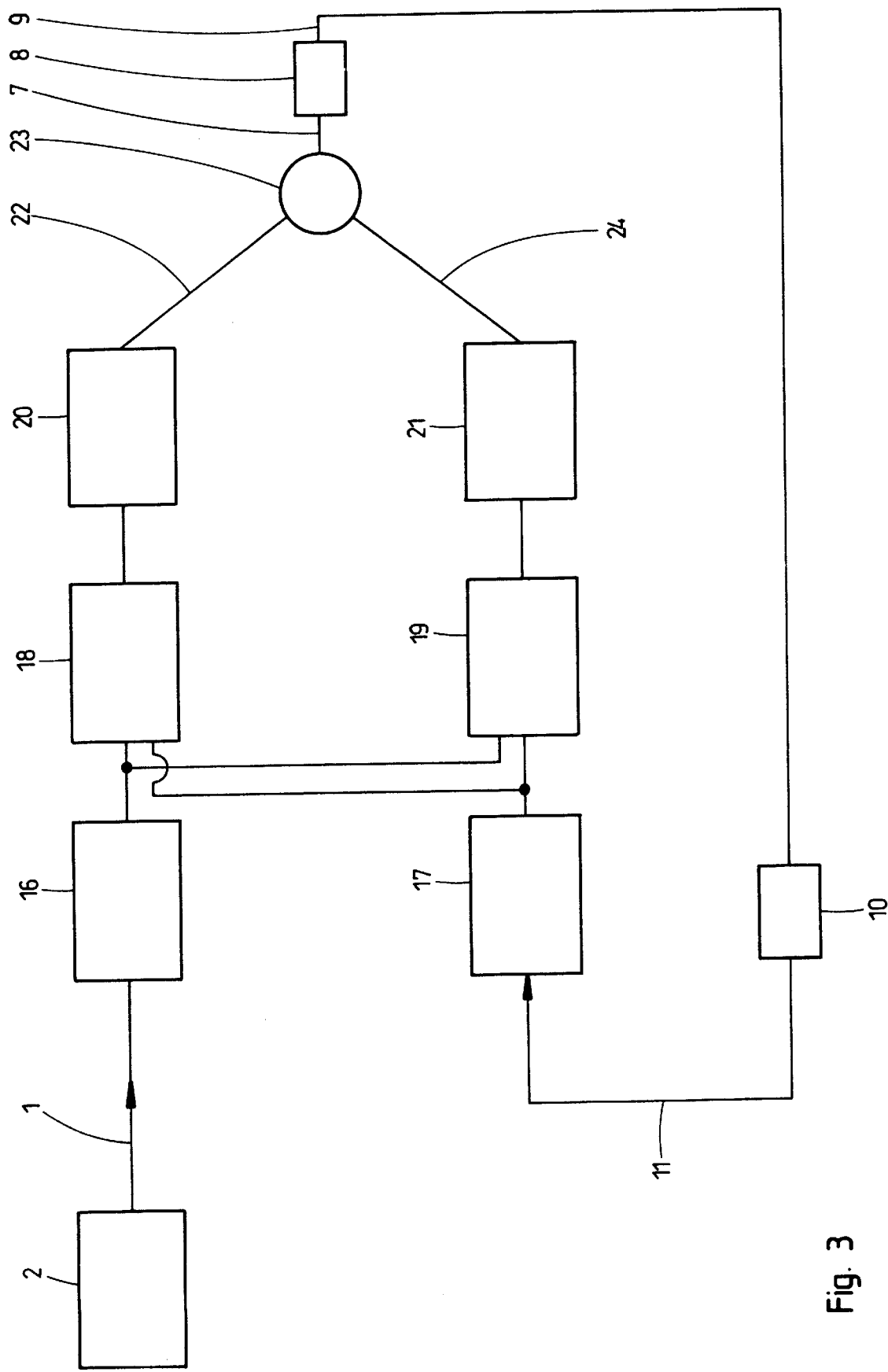
FIG. 3 is a block diagram of another embodiment of the control system according to the present invention.

Another embodiment of the control system according to the present invention is illustrated in the block diagram of FIG. 3. In this embodiment, the transition between the two control principles is represented by a fuzzy logic system. The desired value 1 of the joystick 2 is imparted to the fuzzification block 16. Also, the actual position value 11 is imparted as the output of the measuring system 10 to the fuzzification block 17. Both fuzzified signals now act on the fuzzy position control unit 18 as well as on the fuzzy speed control unit 19. Depending on the respective defuzzification in the blocks 20 and 21, the adjustment signals of the position control unit and the speed control unit 24 are produced. The two adjustment signals are brought together in the block 23 which includes the computation of the "minimum operator". This produces an adjustment signal which ensures a continuous transition between the two control principles according to the present invention.

While specific embodiments of the invention have been shown and described in detail to illustrate the inventive principles, it will be understood that the invention may be embodied otherwise without departing from such principles.

I claim:

1. A control system for axes of movement of handling machines with linear drives and/or pivoting drives for transporting and positioning workpieces relative to and in a target point located within a range, the control system comprising a combination of a speed control means of the axes of movement of the handling machine for moving a workpiece into the range of the target point and a position control means of the axes of movement for a precise positioning of the workpiece in the target point, further comprising a fuzzy logic system at a transition between the speed control means and the position control means.

2. A joystick for operating a control system for axes of movement of handling machines with linear drives and/or pivoting drives for transporting and positioning workpieces relative to and in a target point, the joystick comprising a middle adjustment range located on both sides of a zero point for effecting a position control of an axis of movement for precisely positioning a workpiece in the target point, the middle adjustment range having two end points and the joystick having two end stops, further comprising two outer adjustment ranges each located between one of the end points and one of the end stops of the joystick for effecting a speed adjustment or speed control of the axis of movement for moving the workpiece into the middle adjustment range.

3. The joystick according to claim 2, comprising a fuzzy logic system at each transition between the middle adjustment range and the outer adjustment ranges.

* * * * *